(12) United States Patent
Yassa

(10) Patent No.: US 10,440,328 B2
(45) Date of Patent: Oct. 8, 2019

(54) METHOD AND APPARATUS TO SYNCHRONIZE PERSONALIZED CO-CAST CONTENT WITH USER VIEWING HABITS

(76) Inventor: Fathy F. Yassa, Soquel, CA (US)

(*) Notice: Subject to any disclaimer, the term of this patent is extended or adjusted under 35 U.S.C. 154(b) by 830 days.

(21) Appl. No.: 12/080,825

(22) Filed: Apr. 3, 2008

(65) Prior Publication Data

US 2008/0263588 A1 Oct. 23, 2008

Related U.S. Application Data

(63) Continuation-in-part of application No. 10/776,624, filed on Jan. 20, 2004, now abandoned.

(51) Int. Cl.
| | | |
|---|---|---|
| H04N 7/10 | (2006.01) | |
| H04N 7/173 | (2011.01) | |
| H04N 21/258 | (2011.01) | |
| H04N 21/2668 | (2011.01) | |
| H04N 21/442 | (2011.01) | |
| H04N 21/462 | (2011.01) | |
| H04N 21/61 | (2011.01) | |
| H04N 21/658 | (2011.01) | |
| H04N 21/81 | (2011.01) | |
| H04N 7/088 | (2006.01) | |

(52) U.S. Cl.
CPC ... *H04N 7/17318* (2013.01); *H04N 21/25891* (2013.01); *H04N 21/2668* (2013.01); *H04N 21/44222* (2013.01); *H04N 21/4622* (2013.01); *H04N 21/6125* (2013.01); *H04N 21/6131* (2013.01); *H04N 21/6582* (2013.01); *H04N 21/812* (2013.01); *H04N 7/0887* (2013.01)

(58) Field of Classification Search
None
See application file for complete search history.

(56) References Cited

U.S. PATENT DOCUMENTS

| | | | |
|---|---|---|---|
| 6,097,441 A | 8/2000 | Allport | |
| 6,738,421 B1 * | 5/2004 | Ueno | H04N 21/23432 375/240.01 |
| 7,336,925 B2 | 2/2008 | Zilliacus | |
| 7,360,232 B2 * | 4/2008 | Mitchell | H04N 7/165 348/460 |
| 7,433,414 B2 | 10/2008 | Nguyen et al. | |
| 7,441,260 B1 * | 10/2008 | Kurapati | 725/46 |
| 7,590,991 B2 | 9/2009 | Arad et al. | |
| 7,634,296 B2 | 12/2009 | Haeusel | |
| 7,675,901 B2 | 3/2010 | Wang et al. | |
| 7,751,477 B2 | 7/2010 | Kwentus et al. | |
| 7,930,431 B2 * | 4/2011 | Kuroiwa | H04L 29/06 709/246 |
| 8,082,572 B1 | 12/2011 | Tilford | |
| 8,145,124 B2 | 3/2012 | Yassa | |

(Continued)

FOREIGN PATENT DOCUMENTS

WO 0193461 A1 12/2001

OTHER PUBLICATIONS

U.S. Appl. No. 12/080,825.

(Continued)

*Primary Examiner* — Olugbenga O Idowu
(74) *Attorney, Agent, or Firm* — Sughrue Mion, PLLC

(57) ABSTRACT

A method and apparatus designed to permit content providers to insert personalized content into a television signal based upon the user preferences or viewing habits.

48 Claims, 11 Drawing Sheets

(56) References Cited

U.S. PATENT DOCUMENTS

| | | |
|---|---|---|
| 2002/0129368 A1* | 9/2002 | Schlack .............. G06Q 30/02 |
| | | 725/46 |
| 2002/0147984 A1* | 10/2002 | Tomsen .............. H04N 5/4401 |
| | | 725/109 |
| 2002/0184314 A1 | 12/2002 | Riise |
| 2003/0061077 A1 | 3/2003 | Sagar |
| 2003/0077065 A1 | 4/2003 | Scholten et al. |
| 2004/0117857 A1* | 6/2004 | Bisdikian .......... H04N 7/17309 |
| | | 725/141 |
| 2004/0155985 A1 | 8/2004 | Dethier |
| 2004/0203374 A1 | 10/2004 | Zilliacus |
| 2004/0252562 A1 | 12/2004 | Kim |
| 2005/0095980 A1 | 5/2005 | Chang |
| 2005/0108751 A1 | 5/2005 | Dacosta |
| 2005/0174488 A1 | 8/2005 | Chennakeshu |
| 2005/0177861 A1 | 8/2005 | Ma et al. |
| 2006/0032905 A1 | 2/2006 | Bear et al. |
| 2006/0062314 A1 | 3/2006 | Palin et al. |
| 2008/0077965 A1* | 3/2008 | Kamimaki ............ H04N 7/163 |
| | | 725/105 |
| 2008/0261514 A1 | 10/2008 | Pratt et al. |
| 2008/0305802 A1 | 12/2008 | Barnes et al. |
| 2009/0298535 A1 | 12/2009 | Klein et al. |

OTHER PUBLICATIONS

Cover page of WO 03/015414 Published Feb. 20, 2003.
U.S. Appl. No. 14/225,847.
U.S. Appl. No. 13/411,323.

* cited by examiner

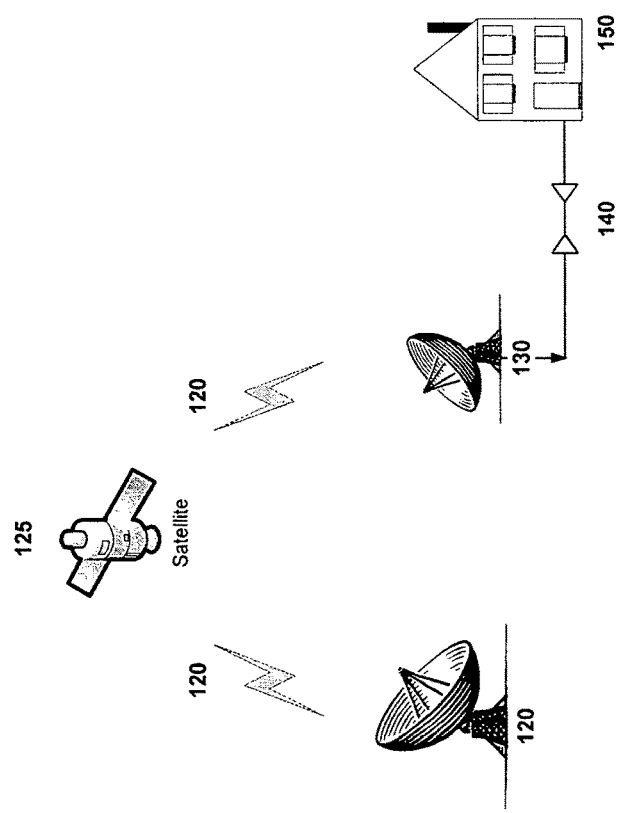
Figure 1 – Prior Art

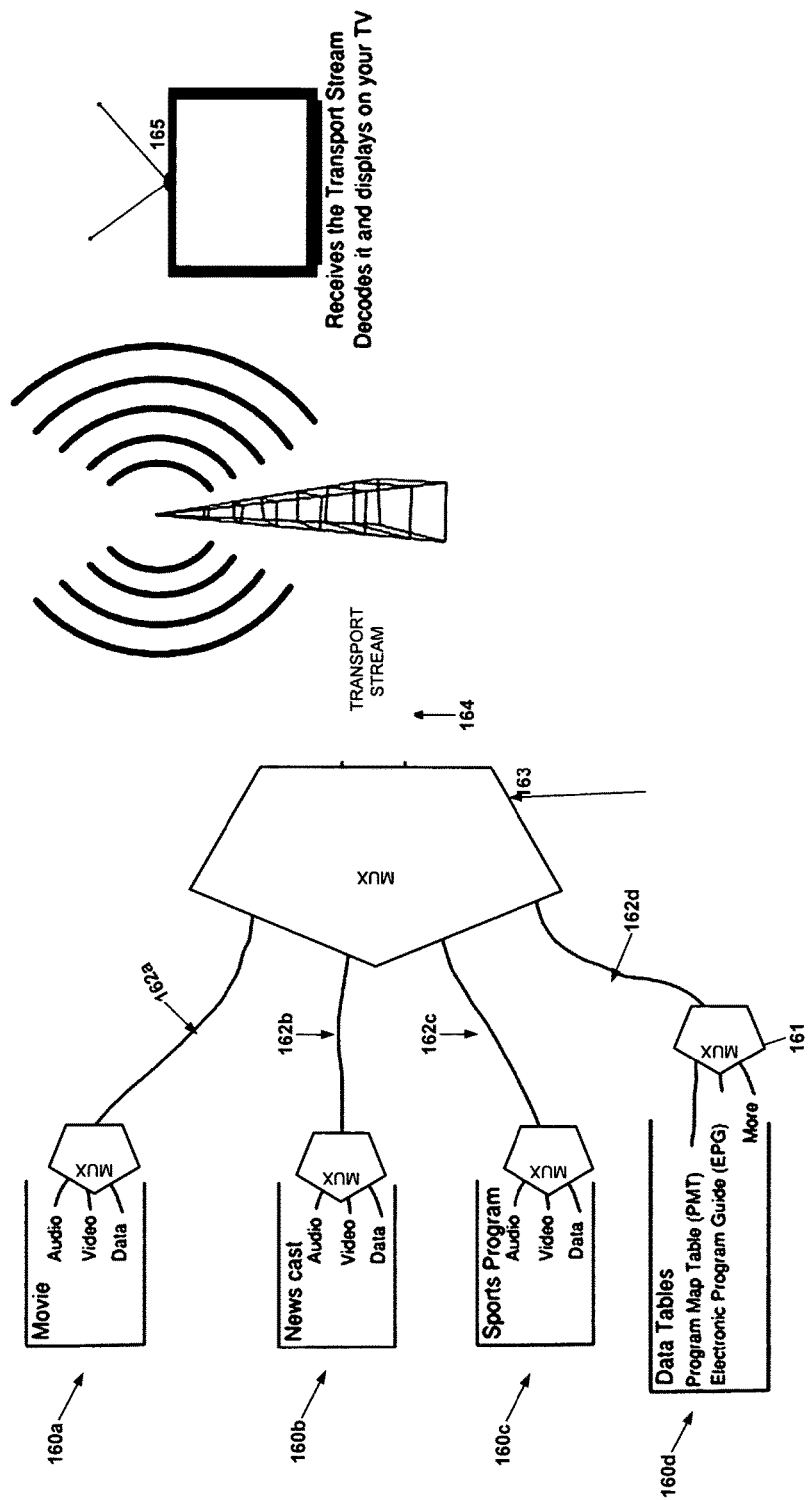
Figure 1a - Prior Art (Replacement Figure)

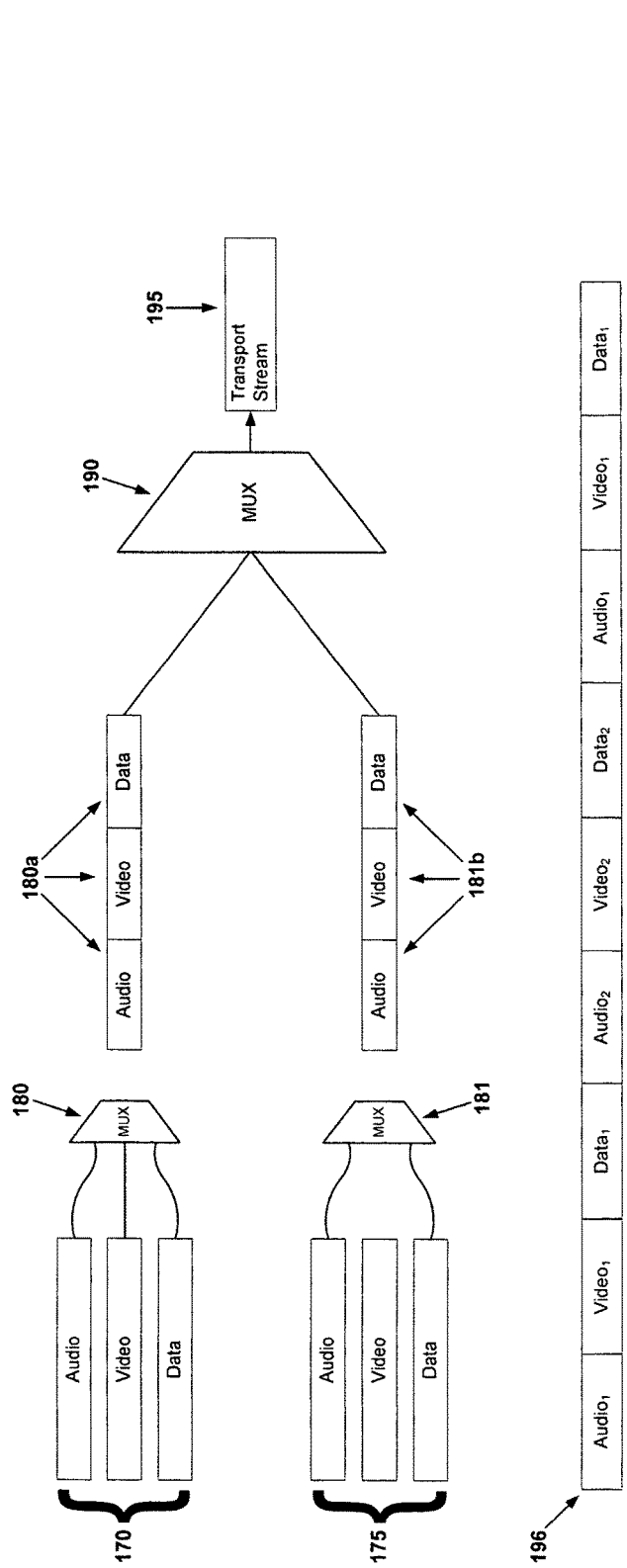
Figure 1b – Prior Art

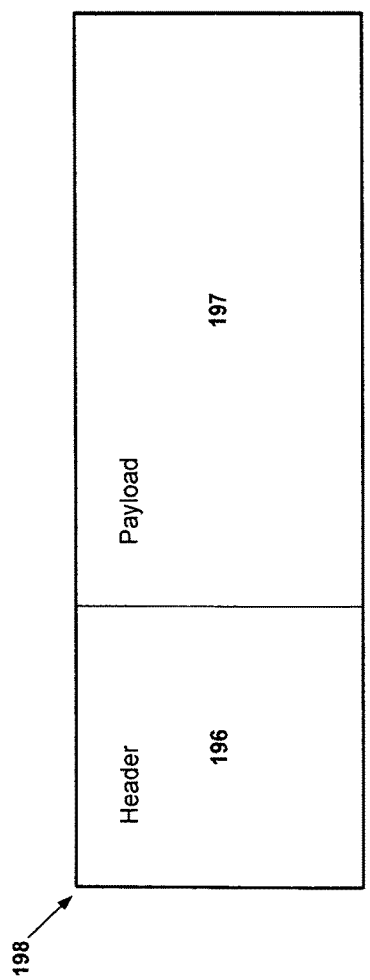
Figure 1c – Prior Art

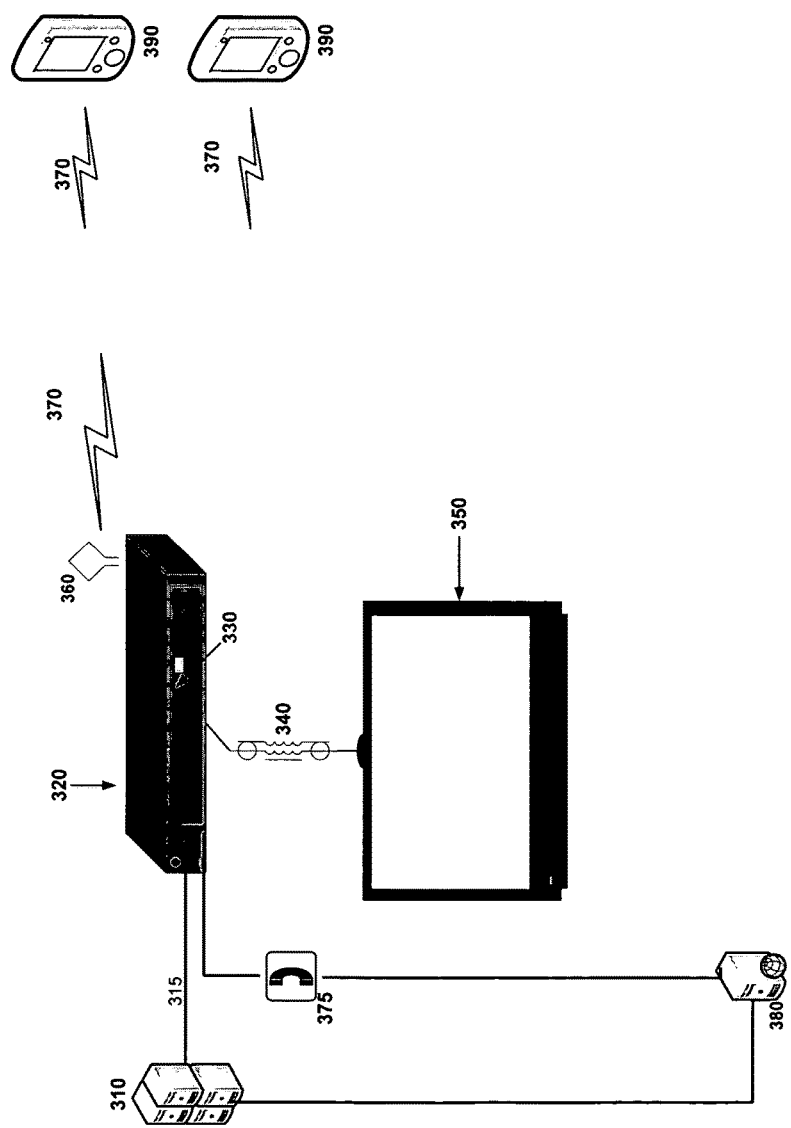
Figure 3 – Replacement Figure

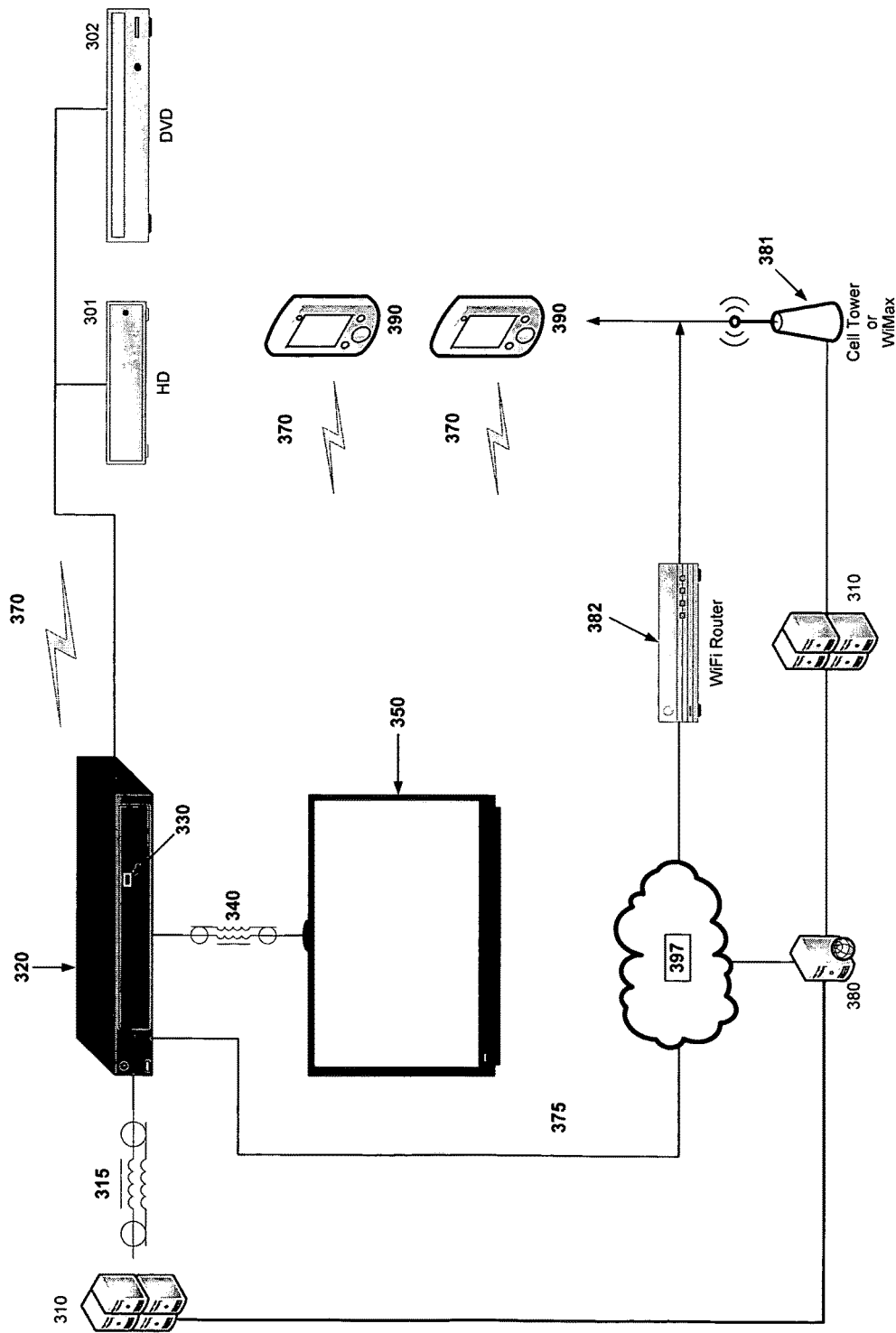
*Figure 3.1 – Replacement Figure*

METHOD AND APPARATUS TO SYNCHRONIZE PERSONALIZED CO-CAST CONTENT WITH USER VIEWING HABITS

CLAIM OF PRIORITY

The present invention is a continuation-in-part U.S. Application No. 10/776,624 filed on Jan. 20, 2004, and incorporates said application by reference as if fully set forth herein.

FIELD OF THE INVENTION

The invention herein discloses an exemplary method and apparatus to synchronize personalized advertising, secondary, or associated and/or interactive content to a viewer's wireless hand held device. Said personalized content may be an alternative or complement to TV viewing, using a digital satellite, cable or terrestrial set-top-box, an internet enabled set-top box, or an analog broadcast with digital extraction and a wireless reception device.

BACKGROUND

Referring to FIG. 1, currently the vast majority of digital television program providers, whether cable, satellite, or terrestrial transmissions, transmit digital content from transmitting station 110 to satellite 125 via channel 120. Satellite 125 retransmits the digital content to one or more satellite dishes 130. Satellite dish 130 may be a large satellite dish owned and operated by a local cable company, or it may a personal satellite dish serving one home. The satellite dish then transmits the content, usually via bi-directional coaxial cable 140, to each cable subscriber via set-top-box (STB) 150. STB 150 demodulates, or extracts information from, the digital signal in the form of packets, or fragments, from the carrier, and performs different signal processing techniques, i.e. error correcting, demultiplexing, descrambling and decoding, to decode the digital programs in the form of video, audio or data, and converts such digital data to analog form to playback such decoded signals on a TV set as shown in FIG. 1. Such connection between the playback device (TV) and the STB are done with cables and use the analog signals produced by the STB.

Referring to FIG. 1a, FIG. 1a illustrates a high level schematic diagram of how digital content is processed for transmission to an end-user. Rich media, e.g. Content 160a, a movie, Content 160b a news cast, Content 160c, a Sports Program, and Content 160d, Data Tables, is first encoded as elementary streams. An elementary stream is the output of a video or audio encoder, and may only contain one type of data, e.g. audio, video, etc. In the MPEG communications protocol, elementary streams are packetized, i.e. broken down into smaller pieces, i.e. packets. In a traditional MPEG system, each transport packet is 188 bytes in length and contains a header, and a payload. The header contains such index information as time index, program identifier, and payload type (whether audio, video, program information, etc.). In addition to being packetized, the various elementary streams of each program are combined or multiplexed (161) into Packetized Elementary Streams 162a, 162b, 162c, and 162d. Each Packetized Elementary Stream contains the combined data (audio, video, date, etc.) of a single program, i.e. Content 160a, 160b, 160c, or 160d.

Each Packetized Elementary Stream is then further multiplexed (163) into single Transport Stream 164 carrying packets from each Packetized Elementary Stream 162a et al.

A transport stream contains packetized data from multiple programs. Transport Stream 164 is broadcast to the consumer and received by the consumer's set top box, STB 165, which demultiplexes Transport Stream 164. When the packets reach the set top box, the set top box demultiplexes, i.e. recombines the packets into single programs, based upon the header information and is able to present the original content to the display unit. The demultiplexer also ensures the desired packets are displayed in the correct chronological order.

Referring to FIG. 1b, FIG. 1b, is an example of a lower level schematic diagram of the creation of a Transport Stream from packetized elementary streams. Elementary Stream 170 represents Program 1. Elementary Stream 175 represents a different program, i.e. Program 2. Multiplexer 180 multiplexes or combines the three elementary streams that compose the audio, video, and data of Program 1 into Single Packetized Elementary stream 180a. Similarly, multiplex 181, multiplexes or combines the three elementary stream that compose the audio, video, and data, of Program 2 into single Packetized Elemental Stream 181a.

Multiplexer 190 combines both Packetized Elementary Streams 180a and 181a into Single Transport Stream 195 which is what is actually broadcast or transmitted to the end user's STB.

Referring to FIG. 1c, FIG. 1c, illustrates a simplified, sample, MPEG compliant packet. Packet 198 is composed of 2 sections, Header 196 and Payload 197.

In the instant description, co-cast means additional programming, i.e. programming not included in the original transport stream, such as advertising, video clips, music, data, URLs, etc., intended for delivery to one or more handheld devices or any other personal device, whether wired or wireless. Co-cast information is personalized based upon user preferences or user viewing habits. Such co-cast content is transmitted in the form of packets within the transport stream and treated just like the original programming by the set top box.

The content provider, i.e. Cable Company, Satellite Company, television network such as ABC or CBS, movie or television studio, etc. may elect to insert Co-Cast information into the transport stream. Like any other information in the transport stream, co-cast information would be packetized with a header and payload. The header would include the traditional information associated with an MPEG header. However, in addition, the header of co-cast information would include an identifier that the packet is a co-cast packet. The payload of the co-cast packet is similar to the payload of a traditional MPEG packet except that it may also include hypertext links, which is not traditionally seen in MPEG packets.

In a regular MPEG based digital television system, the set top box knows the channel line-up by reading the Payload of the Program Association Table. Said Program Association Table traditionally has a program identifier set to ZERO. In the instant invention, available co-cast content is determined by the STB by reading the payload of the Co-Cast Content Association Table, which is analogous to the Program Association Table. The Co-Cast Content Association Table is identified by the Program Identifier in the header.

Referring to FIG. 2, FIG. 2 illustrates an example of how co-cast programming is multiplexed with regular digital programming. Program 1 or Packetized Elementary Stream 250, Co-Cast 1 or Packetized Elementary Stream 260, and Program 2 or Packetized Elementary Stream 270 are transmitted to Multiplexer 280 which combines the three packetized elementary streams into Single Transport Stream 290.

The concept of personalized programming is a relatively recent one within the field of television programming. Originally, a television viewer had no ability to receive personalized or individualized programming. A television show was broadcast at a certain time. Television viewers were limited to watching the programming at the time the few networks dictated.

Eventually, with the advent of cable and satellite systems, television users had far more choices of programming, but a television viewer could only watch programming at a time and date determined by the cable system.

The first major step in personalizing the television viewing experience was with the introduction and popularization of the Video Cassette Records (VCR). The VCR permitted time shifting of programming, i.e. programming could be recorded at one time for later playback. A major limitation of a VCR was that the VCR didn't so much record specific content, but rather records a specified television channel at a specified time interval. The VCR itself does not necessarily know what is being recorded.

A substantial leap in personalizing the television viewing experience came with the invention of the DVR or digital video recorder. Unlike the VCR, a digital video recorder can be programmed to record specific programming, e.g. all new episodes of a given program.

DVRs took personalization another step further through the use of recommendation engines. Based upon the programming viewed by the television user, many DVR's have the ability to make recommendations as to other programming that the television user might enjoy. However, the recommendation engines have no ability to affect what programming the DVR actually receives.

Conversely, the ultimate expression of a personalized viewing experience is the internet. Each user literally picks and choices what content he or she wishes to view. However, the limitation of the internet is that since it is so individualized, it cannot support the number of digital channels that a cable or satellite can deliver to each individual.

BRIEF DESCRIPTION OF THE ILLUSTRATIONS

FIG. 1 illustrates a standard content delivery system using a cable system.

FIG. 1a illustrates a high level schematic view of a traditional content delivery system.

FIG. 1b illustrates a lower level view of the transport layer of a content delivery system.

FIG. 1c illustrates an tradition MPEG compliant packet.

FIG. 3 illustrates a simplified version of the invention where co-cast information is tracked and dynamically entered into the television signal.

FIG. 3.1 illustrates a more complex version of the invention where co-cast information is tracked and dynamically entered into the television signal.

Figure 2:
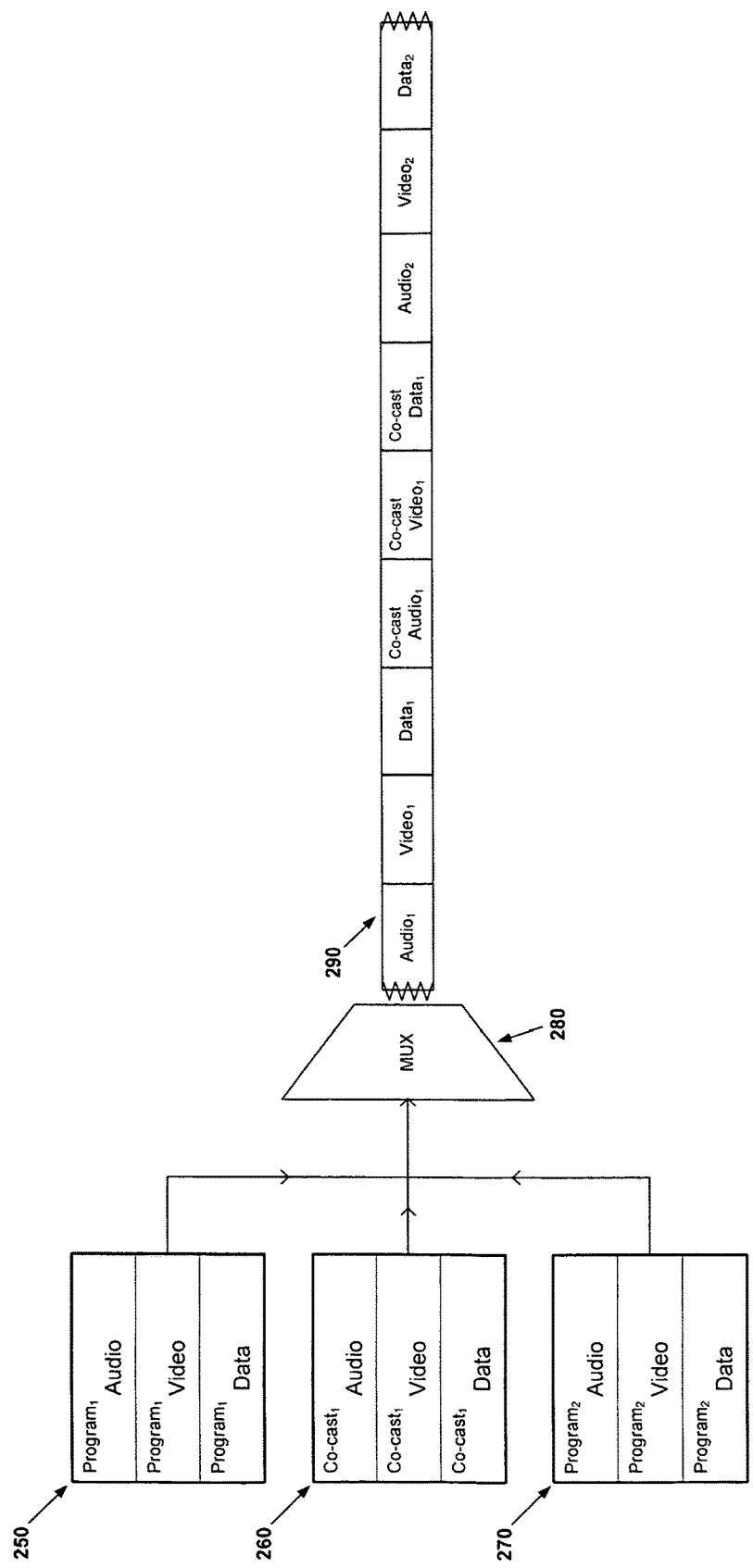
FIG. 2 illustrates co-cast content being multiplexed into a transport stream.
Figure 4:
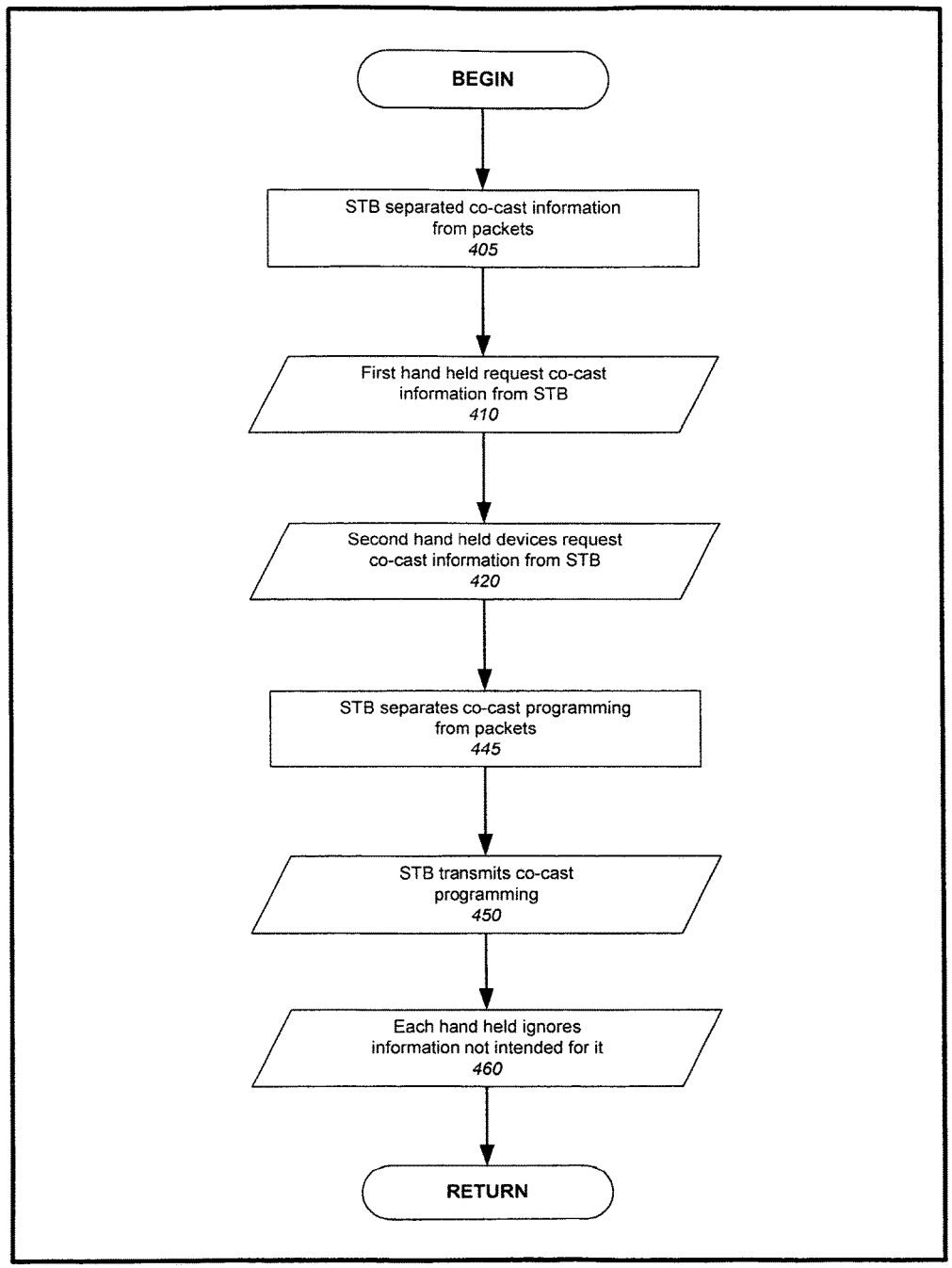

FIG. 4 illustrates a flow diagram of one embodiment of the invention.

Figure 5:
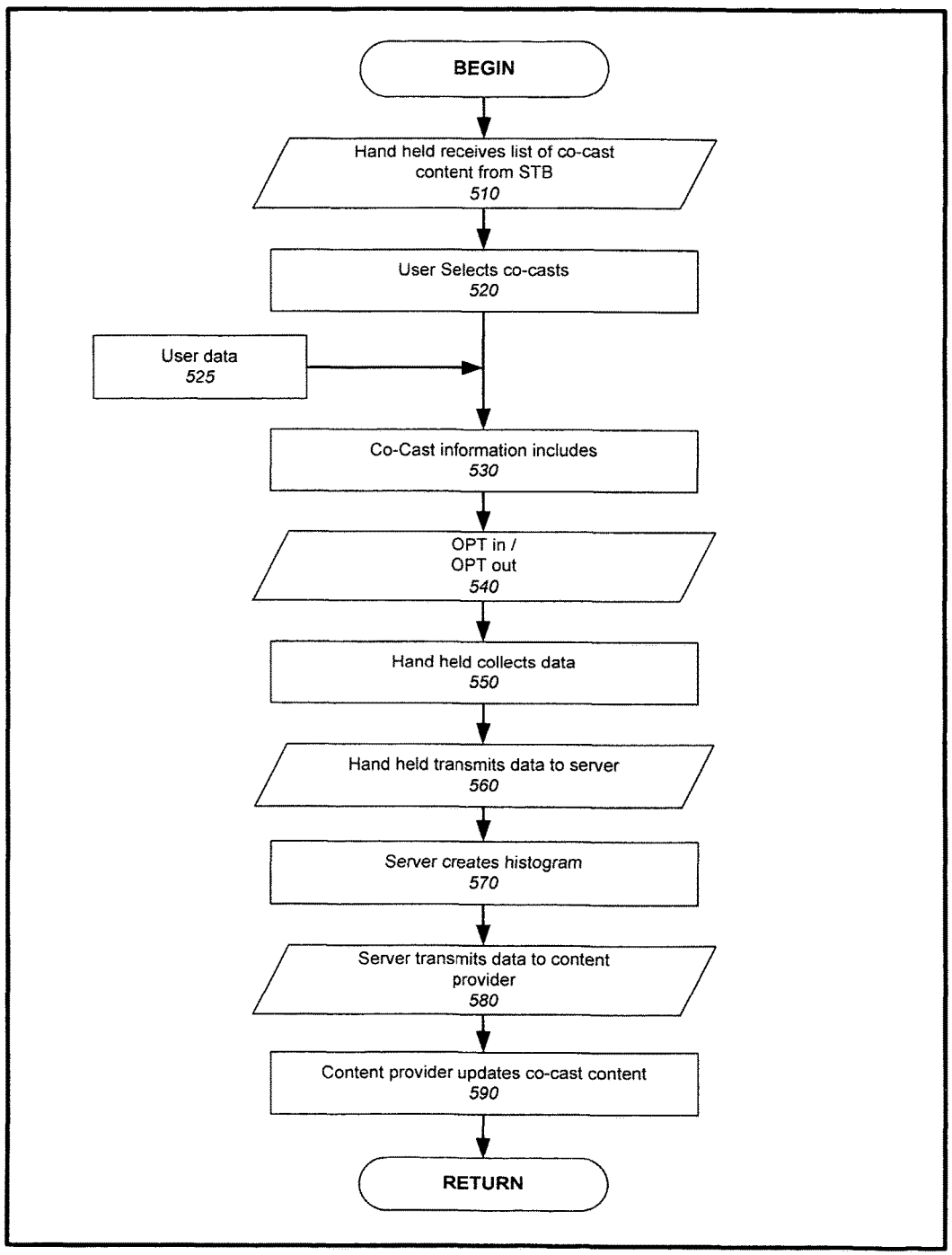

FIG. 5 illustrates a flow diagram of second embodiment of the invention.

Figure 5A:
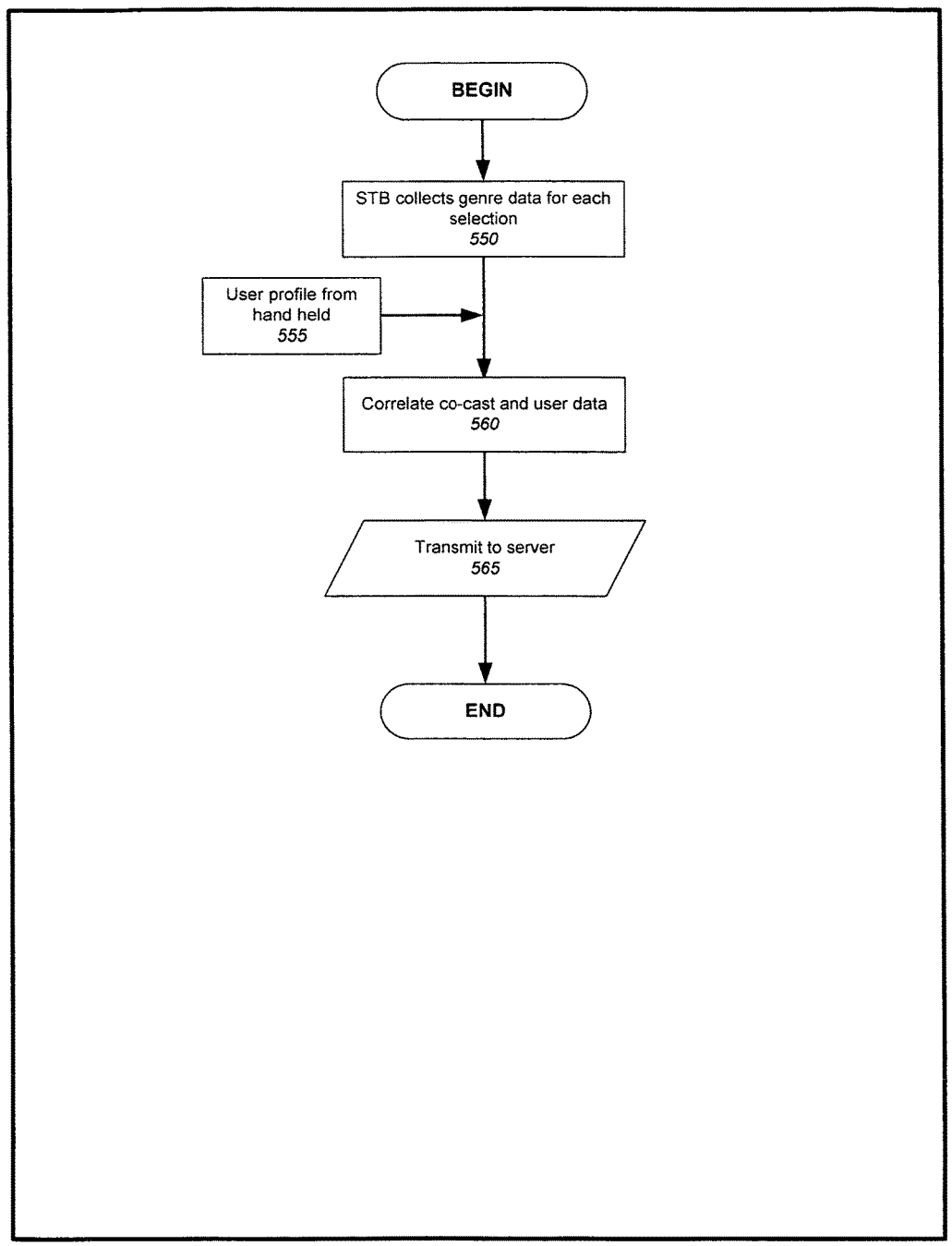

FIG. 5a illustrates a flow diagram of a third embodiment of the invention

Figure 6:
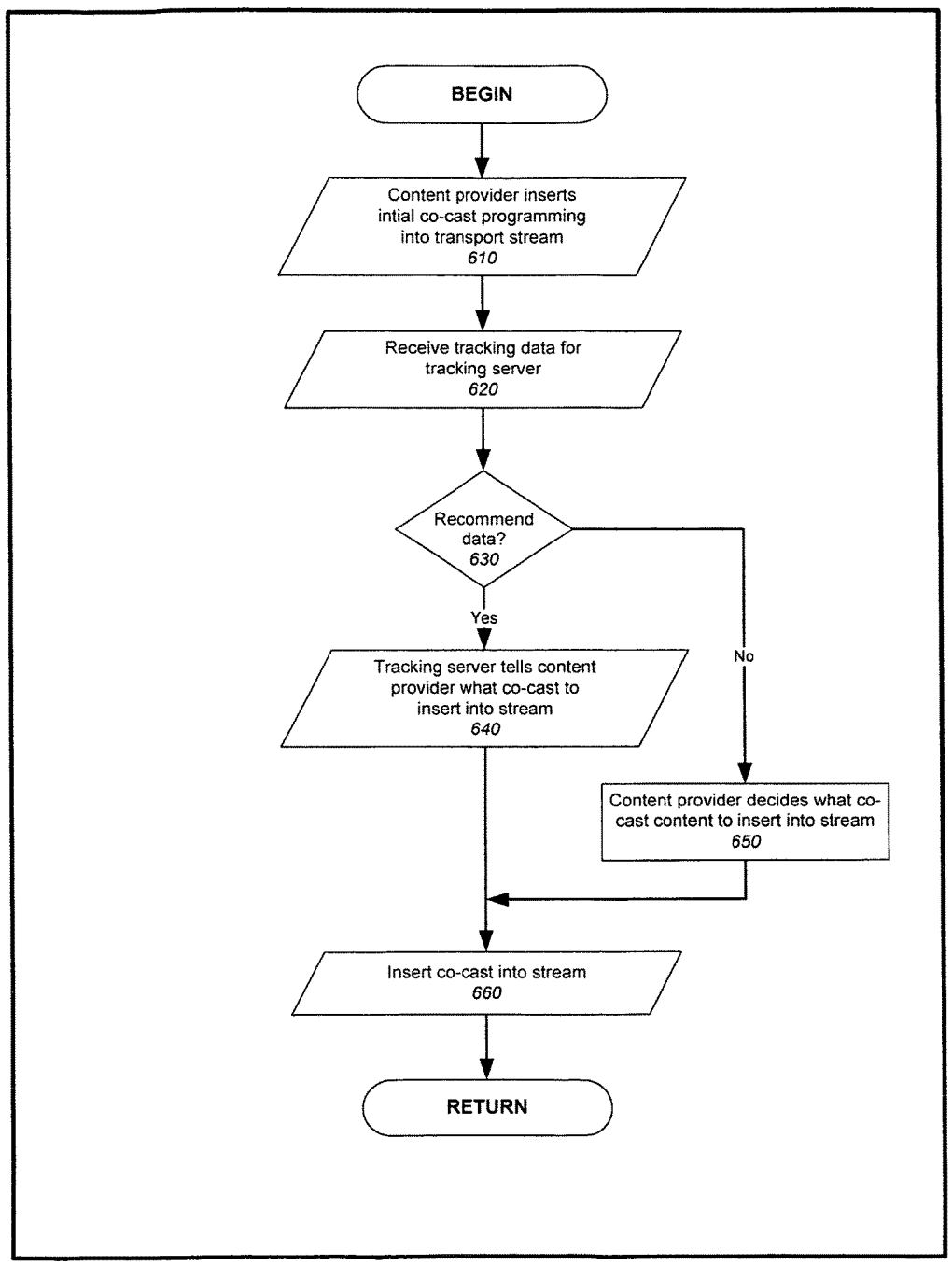

FIG. 6 illustrates a flow diagram of the co-cast information being dynamically inserted into the television signal.

DETAILED DESCRIPTION OF THE EMBODIMENTS

The invention herein mentioned represents an exemplary method and apparatus for the personalization of content delivery, to a hand held wireless device via a set top box. This invention is different from previous content delivery systems in that this invention has the ability to dynamically and in real time, change the content that is being delivered to the end user.

Referring to FIG. 3, FIG. 3 illustrates a simple embodiment of the invention; Content Provider 310 transmits content to STB 320 via Transmission Means 315. Transmission Means 315 may be wired or wireless, e.g. satellite or cable. STB 320 is wirelessly enabled to transmit and receive information via wireless communications such as infra-red, fast-infrared (FIR), Bluetooth, or 802.11x. STB 320 is also configured with two or more demultiplexers 330. Multiple demultiplexers allow different receiving devices to receive different content at the same time. One channel is transmitted via transmission means 340 to television set 350. One or more channels are transmitted wireless via wireless transmitter 360 over one or more bi-directional wireless channels 370, to one or more wireless devices 390. Each wireless device may receive different content up to the number of demultiplexers available (minus the demultiplexer being used by the television set). Such content can be streamed for real time decoding by the handheld device, or downloaded to devices with enough storage capabilities for later decoding or playback. Bi-directional channel 370 allows the hand held devices to request retransmission of corrupted packets from the STB 320, thus allowing rich media to be transmitted. Bi-direction channels 370 may represent diverse technologies, to with, the STB 320 may transmit using one wireless technology, and receive information such as data or commands via another wireless technology. In addition, the invention can communicate via WiMax 381 or Wi-Fi router 382.

Additionally, STB 320 transmits a list of the requested programming along with user information to Tracking Server 380 via telephone line 375. Tracking server 380 tabulates the requested content and the user information to Content Provider 310.

Referring to FIG. 3.1, FIG. 3.1 represents another embodiment of the invention. In FIG. 3.1, unlike FIG. 3, STB 320 is internet enabled and uses Internet 397 to transmit user data and a list of requested programming to Tracking Server 380. Tracking server then sends its data to Content Provider 310 which either inserts new content into the television transport stream, or sends it directly to the hand held devices via Internet 397 and Router 382 or through Transmission means 381, which might be a cell network, or WiMax, or any other wireless protocol.

Additionally, STB 320 may obtain content from a local or attached mass storage device such as Hard Drive 301 or DVD player 302.

Referring to FIG. 4, FIG. 4 is a flow diagram of one embodiment of the invention. At Step 405, the set top box receives a television transport stream, demultiplexes out the packet that contains a list of the available co-cast programming, and transmits it to the handheld devices. At step 410 a first hand held device requests co-cast information from the STB. At step 420 a second hand held device requests co-cast information from the STB. At step 445 multiple tuners separate the co-cast information from the data packets and the independent channel packets. At step 450, the STB transmits the co-cast information and independent channel information to the wireless handheld devices. At step 460 each hand held device receives the transmitted data, ignore the packets not intended for it, and reconstructs the content.

Referring to FIG. 5, FIG. 5 illustrates one embodiment of the tracking methodology. At Step 510 the hand held device receives a list of the available co-cast content. At Step 520, the user selects the desired co-cast content. At Step 525, the hand held accesses stored user data which may include such information as age, income, gender, etc. At Step 530, the co-cast content includes genre information such as drama, comedy, nonfiction, etc. At step 540, part of the user is given the option to opt in or opt out of the tracking. At step 550, the hand held device collects a genre of the selected co-cast programming along with the user data regarding the user's demographics and at step 560 transmits said information to the tracking server via a wireless means such as wi-fi, wimax or cellular network. At step 570 the server tabulates the data and creates a histogram and transmits the histogram to the content provider at step 580. The content provider, which may be a cable provider, a satellite network, a studio, etc. uses this information to determine if the co-cast content being inserted into the download stream should be changed.

Alternatively in FIG. 5*a*, the set top box collects the genre data of the requested co-cast content at step 550. At step 555, the set top box requests and receives the user data from each hand held device and at step 560 the set top box correlates the co-cast genre data and the user data and at step 565 transmits said data to the tracking server through either the internet or through a phone line connection to the tracking server.

Referring to FIG. 6, FIG. 6 illustrates the content provider using the tracking data to modify the co-cast content in the television transport stream. At Step 610, the content provider initially inserts co-cast content into the download television transport stream. At step 620 the content provider receives tracking information, i.e. which co-cast content is being requested and by which demographics. At step 630 the content provider is given the option of receiving recommendations from the tracking server at step 640 regarding which co-cast content to insert into the television transport stream or merely the tracking information at step 650 where the content provider will make its own decision as to what new content to insert into the television transport stream.

At step 660 the content provider dynamically inserts, in real time, co-cast content based upon requested content and user demographics.

I claim:

1. A method for the dynamic delivery of personalized content from a content provider to a mobile device, the method comprising:
    receiving a programming transport stream, the programming transport stream comprising content provided by the content provider multiplexed with the personalized content provided by the content provider based on user demographic information or viewing habits;
    demultiplexing the content and the personalized content from the programming transport stream;
    transmitting a signal corresponding to at least one television channel of the demultiplexed content to a television;
    converting content of at least one television channel of the demultiplexed personalized content to a second transport stream; and
    transmitting the second transport stream to the mobile device,
    wherein the personalized content is audio/video (AV) content.

2. The method of claim 1, further comprising receiving the user demographic information or viewing habits.

3. The method of claim 2, wherein receiving the user demographic information comprises receiving user demographic information or viewing habits from a plurality of mobile devices.

4. The method of claim 3, wherein receiving the user demographic information comprises transmitting the user demographic information or viewing habits from the plurality of mobile devices to the content provider.

5. The method of claim 3, further comprising: creating a recommendation to the content provider the personalized content to be provided by the content provider.

6. The method of claim 4 or 5, further comprising receiving a modified programming transport stream comprising modified personalized content.

7. The method of claim 1, wherein transmitting the second transport stream to the mobile device comprises a set top box wirelessly transmitting the second transport stream to the mobile device.

8. The method of claim 1, wherein transmitting the second transport stream to the mobile device comprises a set top box transmitting the second transport stream to the mobile device over a wired connection.

9. The method of claim 1, further comprising transmitting the user demographic information or viewing habits to the content provider.

10. The method of claim 1, wherein the personalized content comprises content of at least one television channel.

11. The method of claim 1, wherein the personalized content comprises content corresponding to at least one television channel.

12. The method of claim 1, wherein the personalized content comprises at least one television channel.

13. The method of claim 1, wherein the transmitting to the mobile device comprises streaming the AV content via the second transport stream to the mobile device.

14. The method of claim 1, wherein the content of the programming transport stream comprises the AV content in a first format and the AV content in a second format.

15. The method of claim 14, wherein the first format is a first compression scheme and the second format is a second compression.

16. The method of claim 14, wherein the AV content in the first format has a first resolution and the AV content in the second format has a second resolution.

17. A system for dynamically delivering personalized content from a content provider to a mobile device, the system comprising:
    a set top box (STB) configured:
        to receive a programming transport stream, the programming transport stream comprising content provided by the content provider multiplexed with the personalized content provided by the content provider based on user demographic information or viewing habits;
        to demultiplex the content and the personalized content from the programming transport stream;
        to transmit a signal corresponding to at least one television channel of the demultiplexed content to a television;
        to convert content of at least one television channel of the demultiplexed personalized content to a second transport stream; and
        to transmit the second transport stream to the mobile device, wherein the personalized content is audio/video (AV) content.

18. The system of claim 17, wherein the STB is further configured to receive the user demographic information or viewing habits.

19. The system of claim 18, wherein receiving the user demographic information comprises receiving user demographic information or viewing habits from a plurality of mobile devices.

20. The system of claim 19, wherein receiving the user demographic information comprises transmitting the user demographic information or viewing habits from the plurality of mobile devices to the content provider.

21. The system of claim 19, wherein the STB is further configured to: create a recommendation to the content provider the personalized content to be provided by the content provider.

22. The system of claim 20 or 21, wherein the STB is further configured to receive a modified programming transport stream comprising modified personalized content.

23. The system of claim 17, wherein the STB is configured to wirelessly transmit the second transport stream to the mobile device.

24. The system of claim 17, wherein the STB is configured to transmit the second transport stream to the mobile device over a wired connection.

25. The system of claim 17, wherein the STB is further configured to transmit the user demographic information or viewing habits to the content provider.

26. The system of claim 17, wherein the personalized content comprises content of at least one television channel.

27. The system of claim 17, wherein the personalized content comprises content corresponding to at least one television channel.

28. The system of claim 17, wherein the personalized content comprises at least one television channel.

29. The system of claim 17, wherein the transmitting to the mobile device comprises streaming the AV content via the second transport stream to the mobile device.

30. The system of claim 17, wherein the content of the programming transport stream comprises the AV content in a first format and the AV content in a second format.

31. The system of claim 30, wherein the first format is a first compression scheme and the second format is a second compression.

32. The system of claim 30, wherein the AV content in the first format has a first resolution and the AV content in the second format has a second resolution.

33. A set top box (STB) configured to dynamically deliver personalized content from a content provider to a mobile device, the STB comprising:
   a receiver configured to receive a programming transport stream, the programming transport stream comprising content provided by the content provider multiplexed with the personalized content provided by the content provider based on user demographic information or viewing habits;
   a demultiplexer configured to demultiplex the content and the personalized content from the programming transport stream;
   a converter configured to convert content of at least one television channel of the demultiplexed personalized content to a second transport stream; and
   a transmitter configured to transmit a signal corresponding to at least one television channel of the demultiplexed content to a television, and to transmit the second transport stream to the mobile device,
   wherein the personalized content is audio/video (AV) content.

34. The STB of claim 33, wherein the STB is further configured to receive the user demographic information or viewing habits.

35. The STB of claim 34, wherein receiving the user demographic information comprises receiving user demographic information or viewing habits from a plurality of mobile devices.

36. The STB of claim 35, wherein receiving the user demographic information comprises transmitting the user demographic information or viewing habits from the plurality of mobile devices to the content provider.

37. The STB of claim 35, wherein the STB is further configured to: create a recommendation to the content provider the personalized content to be provided by the content provider.

38. The STB of claim 36 or 37, wherein the STB is further configured to receive a modified programming transport stream comprising modified personalized content.

39. The STB of claim 33, wherein the STB is configured to wirelessly transmit the second transport stream to the mobile device.

40. The STB of claim 33, wherein the STB is configured to transmit the second transport stream to the mobile device over a wired connection.

41. The STB of claim 33, wherein the STB is further configured to transmit the user demographic information or viewing habits to the content provider.

42. The STB of claim 33, wherein the personalized content comprises content of at least one television channel.

43. The STB of claim 33, wherein the personalized content comprises content corresponding to at least one television channel.

44. The STB of claim 33, wherein the personalized content comprises at least one television channel.

45. The STB of claim 33, wherein the transmitting to the mobile device comprises streaming the AV content via the second transport stream to the mobile device.

46. The STB of claim 33, wherein the content of the programming transport stream comprises the AV content in a first format and the AV content in a second format.

47. The STB of claim 46, wherein the first format is a first compression scheme and the second format is a second compression.

48. The STB of claim 46, wherein the AV content in the first format has a first resolution and the AV content in the second format has a second resolution.

* * * * *